United States Patent [19]

Shiga et al.

[11] Patent Number: 4,502,333
[45] Date of Patent: Mar. 5, 1985

[54] THREE FORCE BALANCED MECHANISM

[75] Inventors: Tatsuhide Shiga; Mikio Tanaka; Yoshikuni Doki; Yoshihiro Tsuruoka; Masatoshi Fujiwara, all of Kanagawa, Japan

[73] Assignee: Yomatako-Honeywell Co. Ltd., Tokyo, Japan

[21] Appl. No.: 536,285

[22] Filed: Sep. 27, 1983

[30] Foreign Application Priority Data

Sep. 29, 1982 [JP] Japan ................................ 57-170174

[51] Int. Cl.³ .............................................. G01L 7/08
[52] U.S. Cl. ........................................ 73/701; 73/711; 73/716
[58] Field of Search ................. 73/701, 711, 716, 717, 73/718, 719, 720, 721, 722, 432 A

[56] References Cited

U.S. PATENT DOCUMENTS 2,686,893  8/1954  Markson ............................... 73/717
3,274,833  9/1966  Ollivier et al. ....................... 73/701
3,401,561  9/1968  Cook ..................................... 73/701
3,564,923  2/1971  Nudd, Jr. et al. .................... 73/701

Primary Examiner—Donald O. Woodiel
Attorney, Agent, or Firm—Blakely, Sokoloff, Taylor & Zofman

[57] ABSTRACT

In a three force balanced mechanism of the type comprising a floating pivot, an input force transmitting member, a feedback force transmitting member, one end of these members being connected to the floating pivot and a flexible span setting member with one end secured to the floating pivot, the span setting member being inclined with respect to the input force transmitting member, the floating pivot has a cylindrical surface intersecting the two force transmitting members and one end of the span setting member is wound about or unwound from the cylindrical surface. In one embodiment the cylindrical floating pivot is formed a notch having side surfaces orthogonal to each other and the two force transmitting members are secured to respective side surfaces.

4 Claims, 3 Drawing Figures

THREE FORCE BALANCED MECHANISM

BACKGROUND OF THE INVENTION

This invention relates to a three force balanced mechanism.

The three force balanced mechanism of this invention is utilized to detect such process quantities as temperature, pressure liquid level, flow quantity, etc., for converting them into air pressure signal, electric signal, etc., to transmit these converted signals to receivers, controller, for example, or to use the converted signals in the situation. Among prior art pneumatic instruments utilizing the three force balanced system, has been known a instrument constructed as shown in FIG. 1. Thus, the instrument shown in FIG. 1 comprises a detector A and a converter unit B. The detector A comprises a pressure vessel 1 with pressure receiving diaphragms 2 and 3 on both sides thereof. Liquid 4 such as a silicone oil is sealed in the pressure vessel 1. The lower end of a pressure derive out rod 5 is inserted into the pressure vessel 1 and the portion of the rod 5 where the rod 5 extends outwardly from the pressure vessel 1 is hermetically and swingably sealed to the vessel 1 by means of a well known torque tube 6. The inner end of the rod 5 is connected to the inner sides of the pressure receiving diaphragms 2 and 3 through a strap 7.

Consequently, where a high pressure $P_H$ and a low pressure $P_L$ are respectively applied to diaphragms 2 and 3 these diaphragms displace according to the difference between these high and low pressures. This displacement moves the sealed liquid 4 from the high pressure side to the low pressure side so that the pressure-derive-out-rod 5 would tilt about a pivot point O near the torque tube 6 whereby the pressure difference can be derived out.

The counter unit B has a floating pivot 11 and one end of an input force transmitting member 10 is connected to the floating pivot 11, the other end of the input force transmitting member 10 being connected to the pressure-derive-out-rod 5. One end of a power transmitting member 12 comprising feedback force transmitting means is also connected to the floating pivot 11, the power transmitting member 12 extending in a direction at right angles with respect to the input force transmitting member 10. The other end of the power transmitting member 12 is connected to one end of a feedback beam 14 with an intermediate point thereof swingably supported by a fulcrum 13. Near the other end of the feedback beam 14 are provided a nozzle 15, a zero point adjusting spring 16 and a feedback bellows 17. The nozzle 15 opposes the lower end of the feedback beam 14 with a small gap the back pressure generated by the nozzle 15 is amplified by the relay valve and is led to the feedback bellows 17 so as to normally maintain the feedback beam 14 in a balanced state with the pressure-derive-out-rod 5. One end of a span setting wire 18 extending in a direction different from that of the force transmitting member 12 is also connected to the floating pivot 11, and the other end of the wire 18 is held in an arcuate groove 19 about the pivot 11.

Accordingly, in the converter unit B, a vector mechanism is formed by beams about the floating pivot 11, which has a computing performance based on the principle of trigonometric functions. More particularly, when a force $F_1$, caused by the output of the detector A and tending to incline the outer end of the pressure-derive-out-rod 5, is applied to the floating pivot 11 through the input force transmitting member 10 to press the pivot 11 to the right, at portions of the span setting wire 18 and the force transmitting member 12 near the pivot 11 reaction components $F_2$ and $F_3$ of the force $F_1$ and created in the centirifugal directions.

The component $F_3$ is given by an equation $F_3 = F_1 \cdot \tan \theta$ which acts to raise the righthand end of the feedback beam 14 at the lower end of the motion transmitting member 12 so as to rotate the feedback beam 14 in the counterclockwise direction about the fulcrum 13, thus decreasing the gap between the feedback beam 14 and nozzle 15. As a consequence, the back pressure of nozzle increases to obtain an output P out corresponding to force $F_1$ which is transmitted to outside as an air pressure signal through a tube 23 and to the feedback bellows 17. Consequently, the feedback beam 14 rotates in the clockwise direction about fulcrum 13 to balance with the component $F_3$, that is the force $F_1$ applied by the pressure-derive-out-rod 5.

When the outer end of the span setting wire 18 is moved along the arcuate groove 19 to vary angle $\theta$ between the wire 18 and the input force transmitting member 10, the components $F_2$ and $F_3$ vary also correspondingly to the variation in angle $\theta$, with the result that the gain is varied to vary the measuring range.

With such prior art three force balanced mechanism, since a spring support is utilized for the purpose of decreasing the sliding friction loss at the joint between the span setting wire 18 and the floating pivot 11, from the standpoint of construction it is impossible to greatly vary the set angle $\theta$ of the span setting wire 18 (usually, the limit is about 10°), for this reason, there is a defect that the measuring range is narrow. To obviate this defect it has been proposed to construct the feedback bellows 17 as a double wall construction and to change in two stages the feedback force by means of a range transfer switch 24 so as to increase the measuring range. Such proposal, however, requires inner and outer bellows 17A and 17B and the range transfer switch 24 so that the construction is complicated, manufacturing cost is high, and a large zero point shift is resulted at the time of switching the range.

SUMMARY OF THE INVENTION

Accordingly, it is an object of this invention to obtain an improved three force balanced mechanism capable of widening the measuring range.

Another object of this invention is to provide a three force balanced mechanism which can be manufactured readily and can reasily transfer the measuring range.

According to this invention there is provided a three force balanced mechanism of the type comprising a floating pivot, an input force transmitting member, a feedback force transmitting member, one ends of the input force transmitting member and the feedback force transmitting member being connected to the floating pivots and a flexible span setting member with one end secured to the floating pivot, the span setting member being inclined with respect to the input force transmitting member, characterized in that the floating pivot has a cylindrical surface intersecting the two force transmitting members, and one end of the span setting member is wound about or unwound from the cylindrical surface.

BRIEF DESCRIPTION OF THE DRAWINGS

In the accompanying drawings.

DESCRIPTION OF THE PREFERRED EMBODIMENTS

Figure 1:
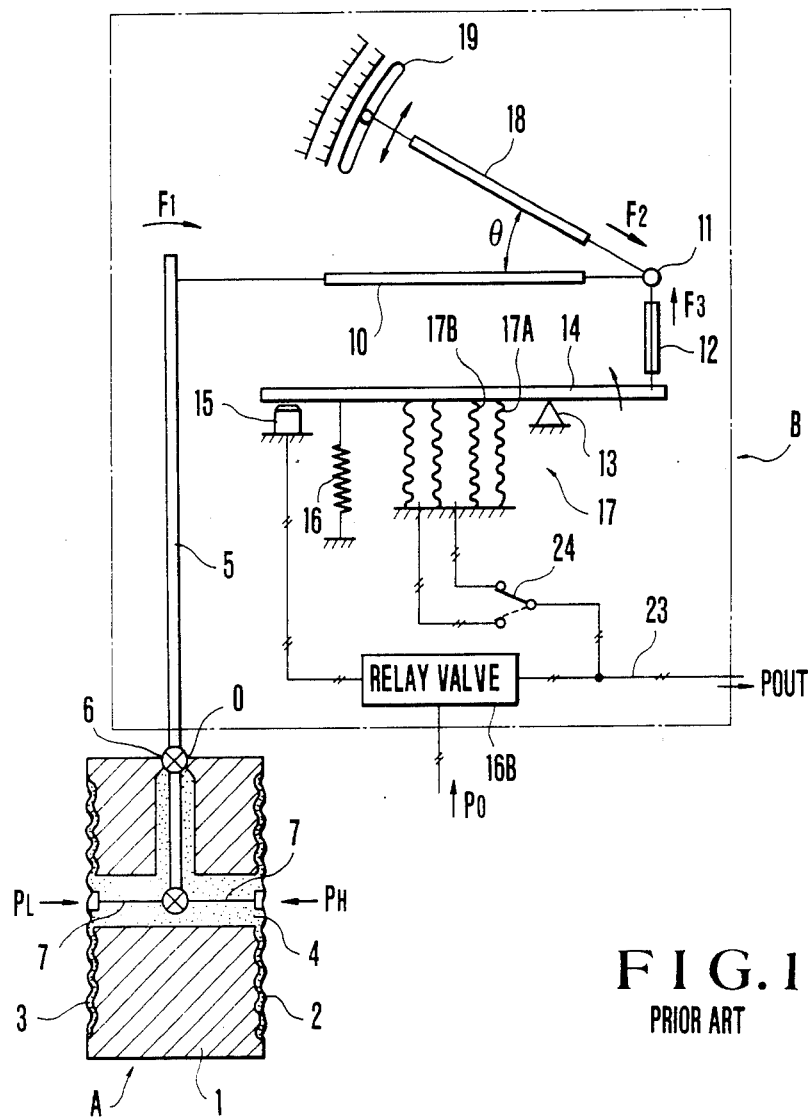
FIG. 1 is a diagrammatic representation showing one example of a prior art three force balanced type mechanism.
Figure 2:
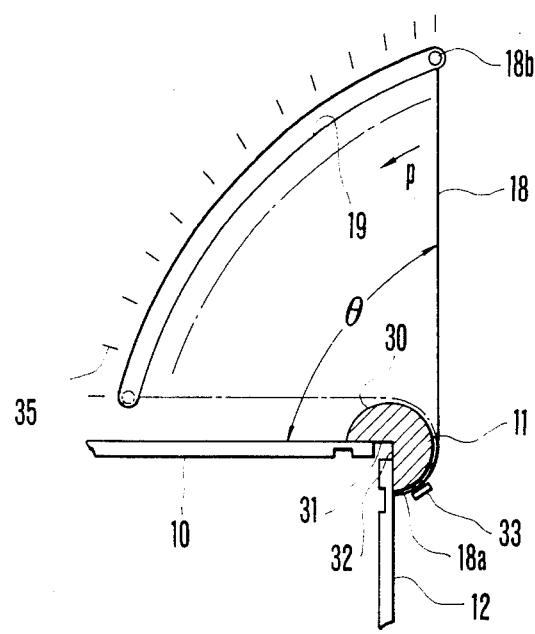
FIG. 2 shows the detail of the floating pivot showing one embodiment of this invention.

FIG. 2 shows a floating pivot showing one embodiment of the three force balanced mechanism according to this invention, in which elements corresponding to those shown in FIG. 1 are designated by the same reference charactors. As shown, the floating pivot 11 has a circular cross-sectional configuration with ¼ cut away. Thus, the pivot 11 has an arcuate side surface 30 extending over an angle of about 270° and orthogonal planes 31 and 32 reaching the center of the pivot 11. One ends of the input force transmitting member 10 and the feedback force transmitting member 12 are secured to the planes 31 and 32 by a proper securing means. One end 18a of the flexible span setting member (made of a flexible wire or strap) 18 is secured by a set screw 33 to a portion of the arcuate side surface 30 near the flat plain 32. The other of outer end 18B of the span setting wire 18 is slidably held in the arcuate groove 19. As a consequence, when the outer end 18b is moved along the arcuate groove 19 in the direction of an arrow P, the inner end 18a of the span setting member 18 is wound about the arcuate side surface 30 of the floating pivot 11, whereas when the outer end 18b is moved in a direction opposit to the arrow P, the inner end 18a would be unwound to increase the length of the member 18. Accordingly, the loci of the outer end 18b become an involute curve. For this reason, the arcuate groove 19 is formed along the involute curve, and a scale 35 for setting the span is graduated along the groove 19. The construction of the other elements is substantially the same as that shown in FIG. 1 except that the feedback bellows 17 is of a single wall construction and that the range transfer switch 24 is eliminated.

This construction permits easy and smooth variation of the angle θ between the span setting member 18 and the force transmitting member 10 in a range of from 0°–90° so that the measuring range can be varied widely. Moreover, as it is not necessary to use a double wall feedback bellows as in the prior art, high accuracy measurement can be made without accompanying zero point shift.

Figure 3:
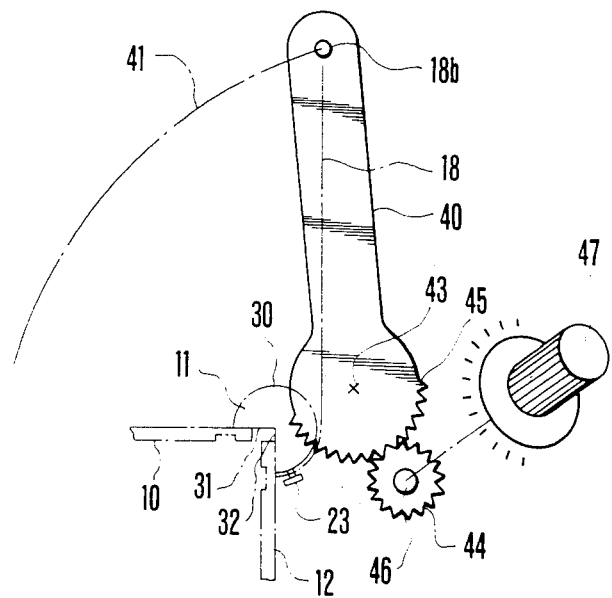
FIG. 3 show the detail of a modified floating pivot according to this invention.

FIG. 3 shows a modified floating pivot embodying the invention. In this modification instead of using the involute curve shaped groove 19 shown in FIG. 2 a rotary arm 40 is provided, and the outer end 18b of the span setting member 18 is connected to the outer end of the rotary arm 40. The rotary arm 40 rotates about the center of a semi-circular locus 41 of the outer end 18b of the span setting member 18. The central portion of the rotary arm 40 is formed with teeth 45 that drive a pinion 44. A knob 47 is mounted on the shaft 46 of the pinion 44. Accordingly, when the knob 47 is rotated the arm 40 is rotated through pinion 44 to vary the angle between the span setting member 18 and the input force transmitting member 10, thus varying the measuring range.

With this modified construction, it is easy to switch the measuring range. Moreover, since the involute curve depicted by the outer end 18b of the span setting member 18 is made to approximate a circular arc and since the center of the circular arc is used as the center of rotation of the rotary arm 40 it is not necessary to provide the arcuate groove 19 graduated with scale 35 as in the embodiment shown in FIG. 2.

Although above described embodiments were explained as applied to a three force balanced type mechanism utilizing nozzle-flapper as detecting means, it should be understood that the invention is not limited to these specific embodiments but can be applied to various types of force balanced type instrument utilizing electric devices for the feedback beam and for imparting feedback force.

As above described according to the three force balanced mechanism of this invention, a floating pivot having a cylindrical circular side surface is used and one end of a span setting member is connected to the side surface such that at the time of switching the measuring range the member is wrapped about the side surface or unwoud therefrom. Accordingly it is possible to readily vary the measuring range over a wide range. Where the outer end of the span setting member is connected to a rotary member rotatable about the center of a substantially circular arc depicted by the free end of the member, the instrument can be manufactured move readily and the switching operation of the measuring range can be effected with a knob.

What is claimed is:

1. In a three force balanced mechanism of the type comprising a floating pivot, an input force transmitting member, a feedback force transmitting member, the ends of said input force transmitting member and said feedback force transmitting member being connected to said floating pivot; and a flexible span setting member with one end secured to said floating pivot, said span setting member being inclined with respect to said input force transmitting member, the improvement wherein said floating pivot has a cylindrical surface intersecting said two force transmitting members and one end of said span setting member is wound about or unwound from said cylindrical surface.

2. The three force balanced mechanism according to claim 1 wherein the cylindrical pivot is formed with a notch having side surfaces at right angles with each other and one ends of said input force transmitting member and said feedback force transmitting member are respectively secured to said side surfaces.

3. The three force balanced mechanism according to claim 1 further comprising an arcuated groove with a scale there along and the other end of said span setting member is moved along said groove.

4. The three force balanced mechanism according to claim 1 which further comprises a rotary arm, a knob, for rotating said rotary arm about its center of rotation, and wherein a free end of said rotary arm carries the other end of said span setting member.

* * * * *

UNITED STATES PATENT AND TRADEMARK OFFICE
CERTIFICATE OF CORRECTION

PATENT NO. : 4,502,333

DATED : March 5, 1985

INVENTOR(S) : Shiga et al.

It is certified that error appears in the above-identified patent and that said Letters Patent is hereby corrected as shown below:

On the title page:

Assignee 73  Delete "Yomatako-Honeywell Co. Ltd" and insert -- Yamatake-Honeywell Co. Ltd. --.

Signed and Sealed this

Second Day of July 1985

[SEAL]

Attest:

DONALD J. QUIGG

Attesting Officer    Acting Commissioner of Patents and Trademarks